US010615495B1

(12) United States Patent
Loui (10) Patent No.: US 10,615,495 B1
(45) Date of Patent: Apr. 7, 2020

(54) ULTRA-WIDEBAND MUTUAL COUPLING COMPENSATION OF ACTIVE ELECTRONICALLY SCANNED ARRAYS IN MULTI-CHANNEL RADAR SYSTEMS

(71) Applicant: National Technology & Engineering Solutions of Sandia, LLC, Albuquerque, NM (US)

(72) Inventor: Hung Loui, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 253 days.

(21) Appl. No.: 15/714,617

(22) Filed: Sep. 25, 2017

(51) Int. Cl.
*H01Q 1/52* (2006.01)
*H01Q 13/02* (2006.01)
*H01Q 3/26* (2006.01)
*H01Q 21/06* (2006.01)
*G01S 7/40* (2006.01)

(52) U.S. Cl.
CPC ............. *H01Q 1/523* (2013.01); *H01Q 3/267* (2013.01); *H01Q 13/0266* (2013.01); *H01Q 21/064* (2013.01); *G01S 7/4021* (2013.01); *G01S 7/4026* (2013.01)

(58) Field of Classification Search
CPC . H01Q 3/01; H01Q 3/02; H01Q 3/267; G01S 7/4026; G01S 7/4021; G01S 7/4008
See application file for complete search history.

(56) References Cited

U.S. PATENT DOCUMENTS

| 5,027,127 | A | * | 6/1991 | Shnitkin | ................ | H01Q 3/267 342/174 |
| 7,362,266 | B2 | | 4/2008 | Collinson | | |
| 8,842,040 | B1 | | 9/2014 | Dorsey et al. | | |
| 9,537,209 | B2 | | 1/2017 | Petkov et al. | | |
| 2011/0122016 | A1 | * | 5/2011 | Lomes | ................... | H01Q 3/267 342/174 |
| 2015/0115978 | A1 | * | 4/2015 | Bories | .................... | H01Q 15/08 324/601 |
| 2015/0138026 | A1 | * | 5/2015 | Shay | ...................... | H04B 17/12 343/703 |
| 2018/0115064 | A1 | * | 4/2018 | Safavi-Naeini | ........ | H01Q 3/267 |

FOREIGN PATENT DOCUMENTS

EP         1349234 A2    10/2003

* cited by examiner

*Primary Examiner* — Marc Anthony Armand
(74) *Attorney, Agent, or Firm* — Madelynne J. Farber; Mark A. Dodd

(57) ABSTRACT

Technologies pertaining to the calibration of ultra-wideband active-electronically-scanned arrays to compensate for transmit and receive mutual coupling between array elements and/or non-ideal isolated channels are described herein. A plurality of near-field measurements are taken by way of probe or probes that may be moved among a plurality of positions aligned with respective elements in the array. For each position of the probe, each of the elements of the array is stimulated to transmit or receive a calibration signal to or from the probe, respectively. Frequency-domain transfer functions are computed from the received signals by the probe or the element for each of the array elements in each of the positions of the probe. The inverse of the matrix of transfer functions comprise frequency-domain transmit and receive correction factors that are used to modify desired array inputs/outputs such that the modified signals correct for mutual coupling between elements in the array.

16 Claims, 8 Drawing Sheets

ULTRA-WIDEBAND MUTUAL COUPLING COMPENSATION OF ACTIVE ELECTRONICALLY SCANNED ARRAYS IN MULTI-CHANNEL RADAR SYSTEMS

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Active electronically scanned arrays (AESA) are now commonly used in multi-channel military radar systems to allow fast scanning of an area with beams of various frequencies. In AESAs, rather than mechanically steering an array aperture (e.g., by way of a gimbal), beam steering is accomplished electronically through manipulation of time and/or phase differences between signals radiated by the elements of the array. The performance of an AESA is therefore dependent on the precise establishment of relative time/phase relationships between signals emitted by the various elements of the AESA.

Antenna elements of AESAs are generally located in close proximity to one another (e.g., less than half of the operational wavelength between adjacent elements) for reasons related to array-dependent scan performance (such as grating lobes) requirements, or size, weight, and power (SWAP) platform constraints. As a result of this proximity, mutual coupling between elements of an AESA can distort the radiated output and received input from the elements. The distortion caused by mutual coupling can affect the relative magnitude and phase differences between signals at each of the antenna elements, which degrades performance of the AESA especially over ultra-wide bandwidths.

Conventional techniques for reducing the negative performance effects of mutual coupling of array elements generally seek to reduce the mutual coupling through modification of the antenna array hardware such as element shielding, array geometries, etc. However, these approaches can substantially increase the cost of an AESA, and may be incompatible with SWAP constraints of a platform to which the AESA is to be mounted. Conventional approaches based on signal processing techniques generally require simultaneous measurements of currents and/or voltages in each element of every pair of elements in an array in order to characterize the mutual coupling between all elements. These measurements may be time-consuming to collect, and may require costly specialized measurement hardware such as multi-port network analyzers.

SUMMARY

The following is a brief summary of subject matter that is described in greater detail herein. This summary is not intended to be limiting as to the scope of the claims.

Various technologies pertaining to calibration of an antenna array (e.g., an AESA) to compensate for mutual coupling between elements of the array are described herein. These technologies allow mutual coupling effects between elements of the array to be corrected without requiring a measuring tool that directly measures currents and/or voltages at terminals of pairs of elements in the array. In an exemplary transmit mutual coupling compensation embodiment, a probe is used to indirectly measure signals indicative of mutual coupling between elements of an array during transmission. The signals are received at a plurality of near-field positions each aligned with a respective element in the array. For each position of the probe, a reference signal is outputted by each of the elements of the array one at a time, in turn. A coherent signal measurement system samples the output of the probe during a radiation period of each element, with the output of the probe indicative of a radiating signal received by way of the probe. Thus, for an n-element array, the probe is used to take n measurements at each of n element-aligned positions where each measurement may be configured to either sweep or instantaneously cover the array's operational bandwidth.

The signal measurement system outputs data indicative of the $n^2$ signals output by the probe to a signal processing system. The signal processing system computes correction factors for each element in the array based upon the $n^2$ signals output by the probe. The correction factors may then be used by the signal processing system to construct a correction matrix. The correction matrix as a function of frequency can be used to correct outputs of all the elements of the array to compensate for mutual coupling effects between the array elements in the signal domain.

By way of example, the correction matrix can include correction factors configured to compensate for mutual coupling between each element of the array and the probe in each of the element-aligned positions of the probe. A signal output system can multiply an ideal output vector in the frequency domain, representative of signals desirably output by each element of the array, by the correction matrix. The frequency-domain vector resulting from this multiplication can be transformed to the signal domain and used as a signal output to the array. The resultant vector comprises values that are pre-distorted such that when the signals represented by the resultant vector are transmitted by way of the array, mutual coupling effects between elements in the array cause the radiated signal output by the array to more closely approximate the ideal output vector than if the ideal output vector had itself been transmitted.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to calibration of antenna arrays to compensate for mutual coupling between array elements are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a single component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

Still further, as used herein and unless specified or otherwise clear from the context, the term "electrical signal" should generally be construed to refer to an electrical signal such as a voltage or current that propagates, is passed along, or is otherwise conveyed by an electrically conductive path, while the term "radiated signal" should generally be construed to refer to an electromagnetic (EM) wave that propagates through the air, a vacuum, a waveguide, etc.

Figure 1:
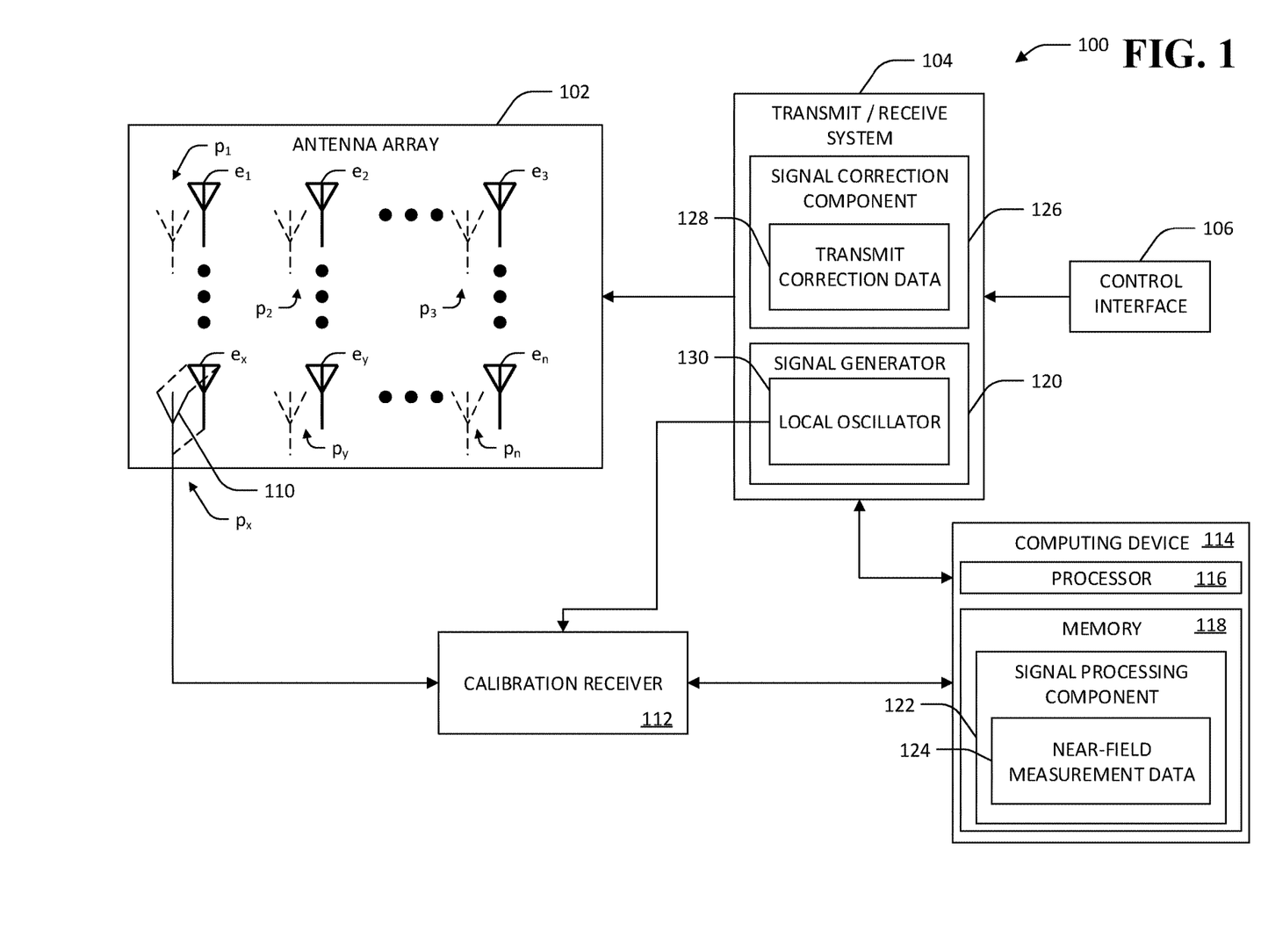
FIG. 1 is a functional block diagram of an exemplary system that facilitates calibration of an antenna array to compensate for mutual coupling during transmission by way of the antenna array.

With reference to FIG. 1, an exemplary system 100 that facilitates calibration of an antenna array to compensate for mutual coupling between elements of the array in a transmission mode is illustrated. The system 100 includes an n-element antenna array 102 that comprises a plurality of elements $e_1$-$e_n$. The system 100 further includes a transmit/receive (T/R) system 104 that outputs signals to and receives signals from each element of the antenna array 102, and a control interface 106 that controls operation of the T/R system 104. The system also includes a probe antenna 110, a calibration receiver 112, and a computing device 114 that comprises a processor 116 and memory 118 loaded with instructions that are executed by the processor 116.

In operation of the array 102 in its intended operational environment (e.g., on board an aircraft or a naval vessel, as a component of a land-based communications system, etc.), the T/R system 104 outputs electrical signals to the antenna array 102 that are then radiated by the elements $e_1$-$e_n$ of the array 102, and/or the T/R system 104 samples signals output by the elements $e_1$-$e_n$ of the array 102 responsive to receipt of radiated signals at the elements $e_1$-$e_n$. By way of example, the T/R system 104 can be configured to have a plurality of channels, a respective channel for each of the elements $e_1$-$e_n$. In a transmission mode of the T/R system 104, the channels pass electrical signals output by a signal generator 120 to their corresponding elements in the elements $e_1$-$e_n$. In a receive mode of the T/R system 104, the channels pass electrical signals output by their corresponding elements in the elements $e_1$-$e_n$ to the T/R system 104, which can then output data indicative of the radiated signals received by the elements $e_1$-$e_n$. In an example, the channels are electrically conductive paths such as conducting wires, circuit board traces, etc. When an element in the elements $e_1$-$e_n$ receives an electrical signal by way of its corresponding channel, the element radiates the signal as an electromagnetic (EM) wave. Various effects can cause the signal radiated by an element to differ from the signal output to the element's channel by the T/R system 104. For example, attenuation, noise, or EM coupling in the channel may cause the electrical signal output by the T/R system 104 to be distorted before reaching the corresponding element of the channel. In other instances, mutual coupling between elements in the elements $e_1$-$e_n$ can cause signals transmitted or received by an element to be distorted. By way of example, a signal radiated from a first element can induce a voltage on a second element. The induced voltage on the second element can be incorrectly interpreted as a signal received from a source external to the array, or the induced voltage on the second element can cause a signal being radiated by the second element to be distorted.

In a calibration procedure, the probe 110 is successively placed in a plurality of positions $p_1$-$p_n$, where each of the positions $p_1$-$p_n$ is aligned with a respective element in the elements $e_1$-$e_n$. For each of the positions $p_1$-$p_n$ of the probe 110, the T/R system 104 outputs signals to the elements $e_1$-$e_n$ and the signals are radiated by way of the elements $e_1$-$e_n$. The calibration receiver 112 samples output of the probe 110 and provides the samples to a signal processing component 122 of the computing device 114 that computes their equivalent representation in the frequency domain. The signal processing component 122 stores the frequency-domain samples as near-field measurement data 124. The signal processing component 122 processes the near-field measurement data 124 to generate a correction factor that is provided to a signal correction component 126 of the T/R system 104. The signal correction component 126 stores the correction factor as transmit correction data 128. Subsequently, in an operational environment, the signal correction component 126 of the T/R system 104 can modify signals output by the signal generator 120 or provide control input to the signal generator 120 based upon the transmit correction data 128, such that a radiated output of the antenna array 102 is compensated for mutual coupling effects between the elements $e_1$-$e_n$ of the array 102.

By correcting for mutual coupling based on inferred coupling, as indicated by the indirect measurements obtained by way of the probe 110, the system 100 corrects for coupling without requiring hardware modification of the array 102 itself, and without requiring use of a network analyzer to directly measure coupling between terminals of pairs of elements in the array 102. Furthermore, the indirect measurements obtained by way of the probe 110 are indicative of coupling effects in transmit/receive channels associated with the elements $e_1$-$e_n$ of the array 102. The correction factors generated by the signal processing component 122 are therefore able to correct for channel coupling effects that would not be indicated in the coupling directly measured by a network analyzer.

In an exemplary embodiment, the elements $e_1$-$e_n$ are identical antennas. In other embodiments, the elements $e_1$-$e_n$ may be antennas with different characteristics. While the elements $e_1$-$e_n$ are shown in FIG. 1 as being arranged in a rectangular pattern, it is to be appreciated that the elements $e_1$-$e_n$ can be arranged in substantially any geometric arrangement. Furthermore, while the probe 110 is shown and described elsewhere herein as a single probe that is moved among the plurality of positions $p_1$-$p_n$, the probe may refer to a plurality of probes, each probe embedded in the array at the plurality of positions $p_1$-$p_n$. Still further, in embodiments the probe may be one or more of the elements $e_1$-$e_n$ and the positions $p_1$-$p_n$ may be the positions of the elements $e_1$-$e_n$ themselves. For example, where the probe 110 is described herein as being positioned at one of the positions $p_1$-$p_n$, the element in the elements $e_1$-$e_n$ that corresponds to that position or nearby positions may also be used in place of the probe. It is to be understood that to facilitate use of an embedded probe or an element of the array 102 as the probe various modifications to functions of the T/R system 104 or the calibration receiver 112 may be required, as will be appreciated by one of skill in the art.

Exemplary operations of the system 100 in connection with calibration of the antenna array 102 are now described in greater detail. In an exemplary calibration, the probe 110 is placed in a position $p_x$ that is aligned with element $e_x$ in the array 102. In one example, the position $p_x$ is a position directly in front of the element $e_x$ in a near-field region with respect to the element $e_x$. The extent of the near-field region of the element $e_x$ may be defined as being within the Fraunhofer distance from the element $e_x$. In other instances, the extent of the near-field region of the element $e_x$ may be approximated as being within 1-4 wavelengths of the element $e_x$ for a given operating frequency (i.e., an operational frequency for which the array 102 is desirably calibrated).

The T/R system 104 outputs a calibration signal to one of the elements $e_1$-$e_n$ in the array 102 by way of the signal generator 120. For example, the T/R system 104 outputs the calibration signal to the element $e_y$. In an exemplary embodiment, the calibration signal is output to the array 102 as an electrical signal by way of a conductive channel. In further examples, the calibration signal can be a chirp signal that sweeps through a band of frequencies, or a time-stepped single-tone signal that has a different frequency at a plurality of different times, etc. The calibration signal can be configured according to a desired operational frequency range of the array 102 in its operational environment. For instance, if the array 102 is desirably operated in the Ku-band, the calibration signal can be configured to sweep through the range of frequencies in the Ku-band.

The signal generator 120 outputs the calibration signal responsive to the T/R system 104 receiving control input from the control interface 106. The control interface 106 may be substantially any kind of interface for providing input to the T/R system 104. For example, the control interface 106 may be a communications interface that facilitates input of data to the T/R system 104 from a computing device or other electronic system. In other examples, the control interface 106 may be an interface, such as a graphical user interface (GUI), that provides control input to the T/R system 104 responsive to receipt of input at the interface 106 from a technician performing calibration of the array 102. The control input from the control interface 106 may specify one of the elements $e_1$-$e_n$ for receipt of the calibration signal from the T/R system 104. The control input may specify parameters of the calibration signal to be output to the elements $e_1$-$e_n$. For example, the control input may specify an amplitude, phase, frequency, etc. for the calibration signal. Responsive to receipt of the calibration signal from the T/R system 104, the element $e_y$ radiates a signal. The signal radiated by the element $e_y$ may be affected by channel distortion or other effects, such that the radiated signal does not exactly match the calibration signal output to the element $e_y$ by the T/R system 104.

The signal radiated by the element $e_y$ is received at the probe 110. Responsive to the radiated signal impinging on the probe 110, the probe 110 outputs an electrical signal that is indicative of the radiated signal received at the probe 110. The electrical signal output by the probe 110 is sampled by a calibration receiver 112. The calibration receiver 112 outputs data indicative of a complex value (i.e., amplitude and phase) as a function of frequency of the electrical signal over a sample period to the computing device 114 (e.g., by performing a fast Fourier transform, FFT, over the samples). The phase value of the electrical signal is determined by the calibration receiver 112 based upon a local oscillator signal received by the calibration receiver 112 from a local oscillator system 130 of the signal generator 120. The local oscillator 130 provides a reference signal against which the phase of any of the signals output by the T/R system 104 can be measured. Hence, the local oscillator signal allows the calibration receiver 112 to maintain phase coherence between samples of the electrical signal output by the probe 110 and signals provided to the array 102 by the T/R system 104. The computing device 114 stores the data received from the calibration receiver 112 in memory 118 as the near-field measurement data 124.

Responsive to receipt of the near-field measurement data 124 from the calibration receiver 112, the signal processing component 122 computes a transmit correction factor based upon the near-field measurement data 124. In an example, the signal processing component 122 computes a transfer function between the calibration signal output by the T/R system 104 to the element $e_y$ and the signal received at the probe 110, as indicated in the near-field measurement data 124. In an embodiment, the signal processing component 122 receives, from the T/R system 104, data indicative of the signal provided to the element $e_y$ by the T/R system 104. In another embodiment, the T/R system 104 outputs a predefined signal to the element $e_y$, and the signal processing component 122 computes the transfer function based in part upon the predefined value of the signal (e.g., as stored in memory 118 of the computing device 114).

In an exemplary embodiment, the process of sampling the output of the probe 110 and updating the near-field measurement data 124 is repeated a plurality of times while the probe 110 is in position $p_x$. For example, while the probe 110 remains in the position $p_x$ that is aligned with the element $e_x$, the T/R system 104 outputs the calibration signal to each of the elements $e_1$-$e_n$ one at a time, such that each of the elements $e_1$-$e_n$ radiates the calibration signal at a different time. The calibration receiver 112 samples the output of the probe 110 at each of the different times and outputs data indicative of the radiated signal received at the probe to the computing device 114 for each of the different times. Thereafter, the near-field measurement data 124 includes data pertaining to signals received by the probe 110 from each of the elements $e_1$-$e_n$.

In further embodiments, the process of sampling the output of the probe 110 and updating the near-field measurement data 124 is repeated for each of the positions $p_1$-$p_n$ that are respectively aligned with the elements $e_1$-$e_n$. Thus, for example, after the probe 110 has received a signal from each of the elements $e_1$-$e_n$ in turn while the probe 110 is in the position $p_x$, the probe 110 is repositioned to the position $p_y$ that is aligned with the element $e_y$. The T/R system 104 then outputs the calibration signal to each of the elements $e_1$-$e_n$ in turn, as described above. The probe 110 receives a radiated signal from each of the elements $e_1$-$e_n$ while the probe 110 is positioned at $p_y$ in front of the element $e_y$. The calibration receiver 112 samples the output of the probe 110 while the probe 110 is receiving the radiated signals at the position $p_y$, and the computing device 114 updates the near-field measurement data 124 based upon those samples.

After the output of the probe 110 has been sampled for every transmitting element $e_1$-$e_n$ for each of the positions $p_1$-$p_n$ of the probe 110, the near-field measurement data 124 comprises data indicative of a radiated signal received by the probe 110 from each of the elements $e_1$-$e_n$ while the probe 110 is in each of the positions $p_1$-$p_n$. Based on the near-field measurement data 124, the signal processing component 122 can compute a respective frequency-domain transfer function, via Fourier transform for example, from the input of each of the elements $e_1$-$e_n$ to the probe 110 at each of the different positions. The transfer function as a function of frequency can be arranged in an n×n transfer matrix as follows:

$$[T] = \begin{bmatrix} t_{11} & t_{12} & \cdots & t_{1n} \\ \vdots & \vdots & \vdots & \vdots \\ t_{n1} & t_{n2} & \cdots & t_{nn} \end{bmatrix}_{n \times n}$$

where an element $t_{jk}$ of the matrix [T] is the frequency-domain transfer function from the input signal of a kth element of the array 102 to the output of the probe 110 while the probe is in a position $p_j$ aligned with a jth element in the array 102, and n is the number of elements in the array 102. For example, the element $t_{n2}$ of [T] is the transfer function from the calibration signal provided by the T/R system 104 to the second element $e_2$ of the array 102, to the output signal of the probe 110 sampled while the probe 110 was in the position $p_n$.

For a linear system, the transfer matrix [T] relates a vector of frequency-domain signals, $[a]_{n \times 1}$, provided to the elements $e_1$-$e_n$ of the array 102 by the T/R system 104, to a vector of frequency-domain signals, $[c]_{n \times 1}$, observed to be the radiated output of the elements $e_1$-$e_n$, according to the following equation:

$$[c]=[T][a]$$

In other words, by virtue of mutual coupling and other distortive effects (e.g., channel coupling distortion), the intended output vector [a] of the antenna array 102, given as a function of frequency, is distorted according to the transfer matrix [T] such that the actual observed output of the antenna array 102 is given by the vector [c]. From the equation [c]=[T][a], if [c] is set as a signal that is desirably output by the array 102, an input vector to the array 102, [a], (e.g., as output to the array 102 by the T/R system 104) that at least partially corrects for mutual coupling between elements of the array 102 can be determined based upon the following equation:

$$[a]=[T]^{-1}[c]$$

In this formulation, the vector [c] is an ideal array output vector that comprises an ideal (desired) output signal for each of the elements $e_1$-$e_n$ in the array 102, $[T]^{-1}$, the inverse of the matrix [T], is a transmit correction factor for the array 102, and the vector [a] is a compensated array output vector that comprises a compensated array output signal for each of the elements $e_1$-$e_n$ in the array 102. In the exemplary system 100, the signal processing component 122 generates the transmit correction factor matrix $[T]^{-1}$ based on the near-field measurement data 124 over a desired operational frequency span of the transmit signal. The computing device 114 outputs the matrix $[T]^{-1}$ as a function of frequency to the T/R system 104 where it is retained by the signal correction component 126 as the transmit correction data 128. Subsequently, responsive to receipt of control input from the control interface 106 at the T/R system 104, where the control input is indicative of an ideal array output for each of the elements $e_1$-$e_n$ of the array 102, the signal correction component 126 modifies the ideal array output based upon the transmit correction data 128 to generate a compensated array output. In an example, the control input from the control interface 106 comprises an ideal output vector of signals desirably output by each of the elements $e_1$-$e_n$. The signal correction component 126 multiplies this vector by the inverse transfer matrix $[T]^{-1}$ to yield a compensated array output vector as a function of frequency. The frequency-domain compensated array output vector is then transformed to the signal domain, and provided to the array 102 for transmission by way of the array 102. The compensated array output vector is configured to at least partially correct for mutual coupling between elements in the array 102 such that an actual radiated output of the array 102 more closely approximates the signals of the ideal output vector than if the ideal output vector had itself been transmitted by way of the array 102.

Since transmit characteristics of the elements $e_1$-$e_n$ may vary with temperature, the process of making measurements of radiated output of the elements of the array 102 by way of the probe 110 can be repeated for several different temperatures or temperature ranges. The signal processing component 122 can generate a transfer function $t_{jk}$ for each of the several temperature ranges, and can compute a $[T]^{-1}$ matrix for each of the temperature ranges. Therefore, the transmit correction data 128 can comprise a separate transmit correction factor for each of several temperature ranges. Subsequently, in an operational environment of the array 102, the T/R system 104 selects the appropriate transmit correction factor for the temperature of the array 102 in the operational environment.

Figure 2:
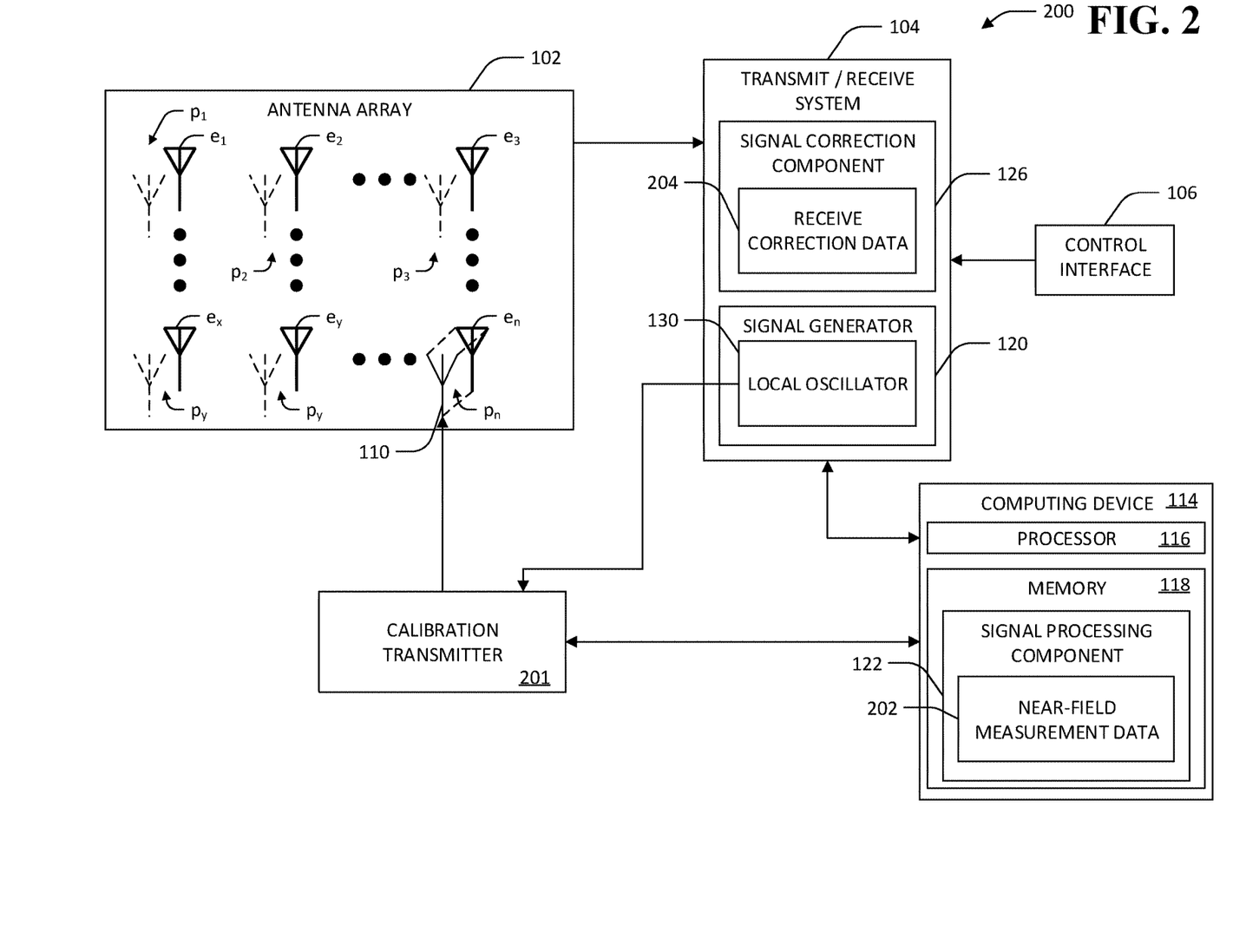
FIG. 2 is a functional block diagram of an exemplary system that facilitates calibration of an antenna array to compensate for mutual coupling during reception by way of the antenna array.

Referring now to FIG. 2, an exemplary system 200 that facilitates compensation of signals received by way of an antenna array to correct for mutual coupling between elements of the array is illustrated. The system 200 comprises the array 102, the T/R system 104, the probe 110, the computing device 114 and the control interface 106. The system 200 further comprises a calibration transmitter 201 that outputs a calibration signal to the probe 110. In an example, the calibration transmitter 201 outputs the calibration signal responsive to receiving control input that specifies a waveform or parameters of a waveform that is to be used as the calibration signal from the computing device 114. The calibration transmitter 201 receives the local oscillator signal from the local oscillator 130 of the signal generator 120 to maintain phase coherence as in the exemplary system 100. In the exemplary system 200, the probe 110 is positioned in each of the positions $p_1$-$p_n$ (e.g., $p_n$ as shown in FIG. 2).

While the probe 110 is in each of the positions $p_1$-$p_n$, the calibration transmitter 201 outputs the calibration signal to the probe 110. Responsive to receiving the calibration signal, the probe 110 radiates the signal, whereupon the signal radiated by the probe 110 is received at each of the elements $e_1$ to $e_n$ of the array 102. The T/R system 104 samples output of each of the elements in turn to generate near-field measurement data 202 that is indicative of the radiated signal received at each of the elements $e_1$ to $e_n$, whereupon the T/R system 104 outputs the near-field measurement data 202 to the computing device 114. In other exemplary embodiments, the calibration transmitter 201 and the calibration receiver 112 of FIG. 1 can be implemented as a same device that receives signals from the probe in a transmit calibration mode and transmits signals to the probe in a receive calibration mode. Furthermore, in some embodiments one or more channels of the T/R system 104 (e.g., a T/R system configured for deployment with the array 102 in an operational environment of the array) can perform functions described herein as being performed by the calibration receiver 112 or the calibration transmitter 201. In other embodiments, signals received by way of each of the elements $e_1$ to $e_n$ can be sampled by way of a separate receiver (e.g., the calibration receiver 112) as in the exemplary system 100 discussed above. The sampling of the outputs of the elements $e_1$-$e_n$ is repeated while the probe 110 radiates the calibration signal in each of the positions $p_1$-$p_n$ such that the near-field measurement data 202 comprises a value of a signal output by each of the elements $e_1$-$e_n$ for each different position of the probe 110.

The signal processing component 122 of the computing device 114 generates input correction data 204 based upon the near-field measurement data 202. Similarly to the transmit calibration discussed above with respect to the system 100 of FIG. 1, the signal processing component 122 computes a frequency-domain transfer function from the output of the probe 110 in each of the positions $p_1$-$p_n$ to each of the elements $e_1$-$e_n$. The frequency-domain transfer functions can be arranged in an n×n transfer matrix as follows:

$$[R] = \begin{bmatrix} r_{11} & r_{12} & \cdots & r_{1n} \\ \vdots & \vdots & \vdots & \vdots \\ r_{n1} & r_{n2} & \cdots & r_{nn} \end{bmatrix}_{n \times n}$$

where an element $r_{jk}$ of the matrix [R] is the transfer function from the calibration signal output by the probe 110 while the probe 110 was in a position $p_k$ aligned with a kth element of the array 102, to the output of a jth element in the array 102, and n is the number of elements in the array 102. For example, the element $r_{n2}$ of [R] is the transfer function from the calibration signal provided by the calibration transmitter 201 to the probe 110 while the probe 110 was in the position $p_2$, to the output of the element $e_n$.

Similarly to the matrix [T], the transfer matrix [R] relates a vector of signals as a function of frequency, [c], that are actually incident on the elements $e_1$-$e_n$ of the array 102 to a frequency-domain vector, [b], of signals that are received at respective channels of the T/R system 104 that correspond to the various elements $e_1$-$e_n$ of the array 102, according to the following equation:

$$[b]=[R][c]$$

In other words, in the receive case, the vector of signals actually incident upon the elements of the antenna array as a function of frequency, [c], is distorted by mutual coupling and other effects according to the matrix [R] such that the signals sampled by the T/R system 104 for each of the elements $e_1$-$e_n$ are given by the vector [b]. From the equation [b]=[R][c], the vector of frequency-domain signals [c] that is actually incident upon the array 102 can be determined from the signals [b] that are sampled by the T/R system 104 based upon the following equation:

$$[c]=[R]^{-1}[b]$$

The matrix $[R]^{-1}$ is the inverse of the matrix [R] and can be used as a receive correction factor in the frequency domain for signals received by way of the array 102. The signal processing component 122 generates the receive correction factor as a function of frequency $[R]^{-1}$ based upon the near-field measurement data 202 (e.g., by computing [R] and thereafter performing a matrix inversion algorithm over [R] to generate $[R]^{-1}$). The computing device 114 outputs the receive correction factor $[R]^{-1}$ to the T/R system 104 wherein it is stored as receive correction data 204 by the signal correction component 126. Subsequently, responsive to receipt of a radiated signal at the antenna array 102, the T/R system 104 samples outputs of the elements $e_1$-$e_n$ to generate a vector [b] representing signals received at the elements $e_1$-$e_n$. The signal correction component 126 then multiplies [b] by $[R]^{-1}$ to generate $[b]^{-1}$, a frequency-domain compensated receive vector that at least partially corrects for mutual coupling between elements in the array 102. The frequency-domain compensated receive vector can then be transformed to the signal domain and output by the T/R system 104 to a computing device or other system that can perform any of various additional processing functions to interpret or decode data that may be encoded on the radiated signal received at the antenna array 102.

Figure 3:
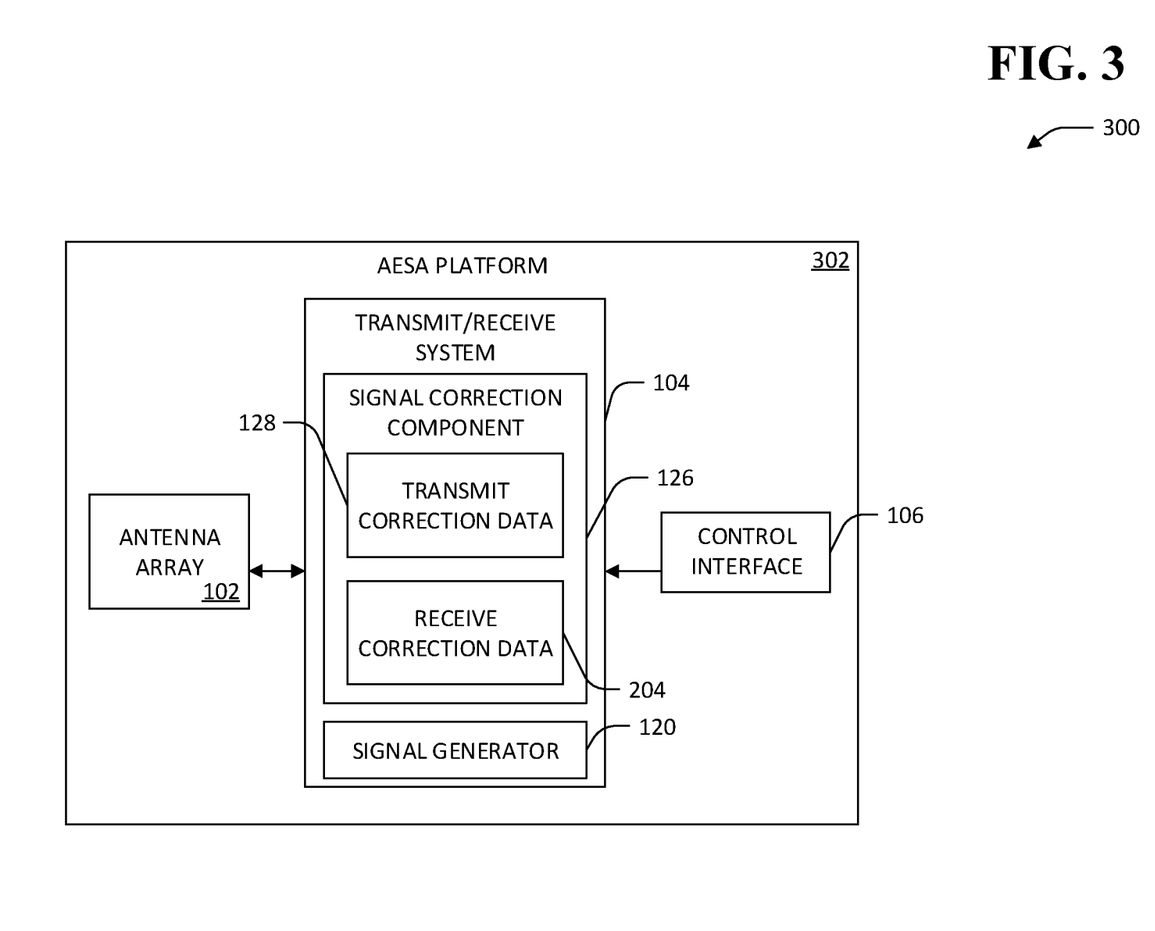
FIG. 3 is a functional block diagram of an exemplary system for compensating for mutual coupling between elements of an antenna array in an operational environment.

Referring now to FIG. 3 an exemplary system 300 that facilitates compensating for mutual coupling of elements in an antenna array 102 in an operational environment of the array 102 is shown. The system 300 comprises an AESA platform 302 on which are mounted the antenna array 102, the T/R system 104, and the control interface 106. The AESA platform 302 can be substantially any platform on which an AESA is desirably mounted, such as an aircraft, a naval vessel, a communications system base station, etc. The system 300 exhibits improved beam steering capability of the array 102 by virtue of improved phase control of signals output by the array elements. This improved phase control is enabled by correction for mutual coupling between the elements of the AESA that is implemented by the signal correction component 126.

In some cases, the transmit correction data 128 may indicate a correction to the output of the T/R system 104 that is incompatible with hardware limitations of the AESA platform 302, the antenna array 102, the T/R system 104, or other supporting hardware of those systems. For example, in an embodiment wherein the antenna array 102 and T/R system 104 are mounted on an aircraft, the aircraft's onboard power systems may be unable to supply a voltage indicated by the transmit correction data 128 as being necessarily supplied to an element of the array 102. Therefore, in various embodiments, the signal correction component 126 can be configured to identify instances where the correction to the output of the T/R system 104 that is required by the transmit correction data 128 exceeds one or more operational parameters of the system 300. In such instances, the signal correction component 126 can implement additional corrections to signals to be output to the array so that the T/R system 104 is capable of outputting those signals. For example, the signal correction component 126 may reduce an overall power output of a transmitted signal in order to reduce the power necessarily supplied to one of the elements.

FIGS. 4-7 illustrate exemplary methodologies relating to calibration of an antenna array to compensate for mutual coupling between elements of the array. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 4:
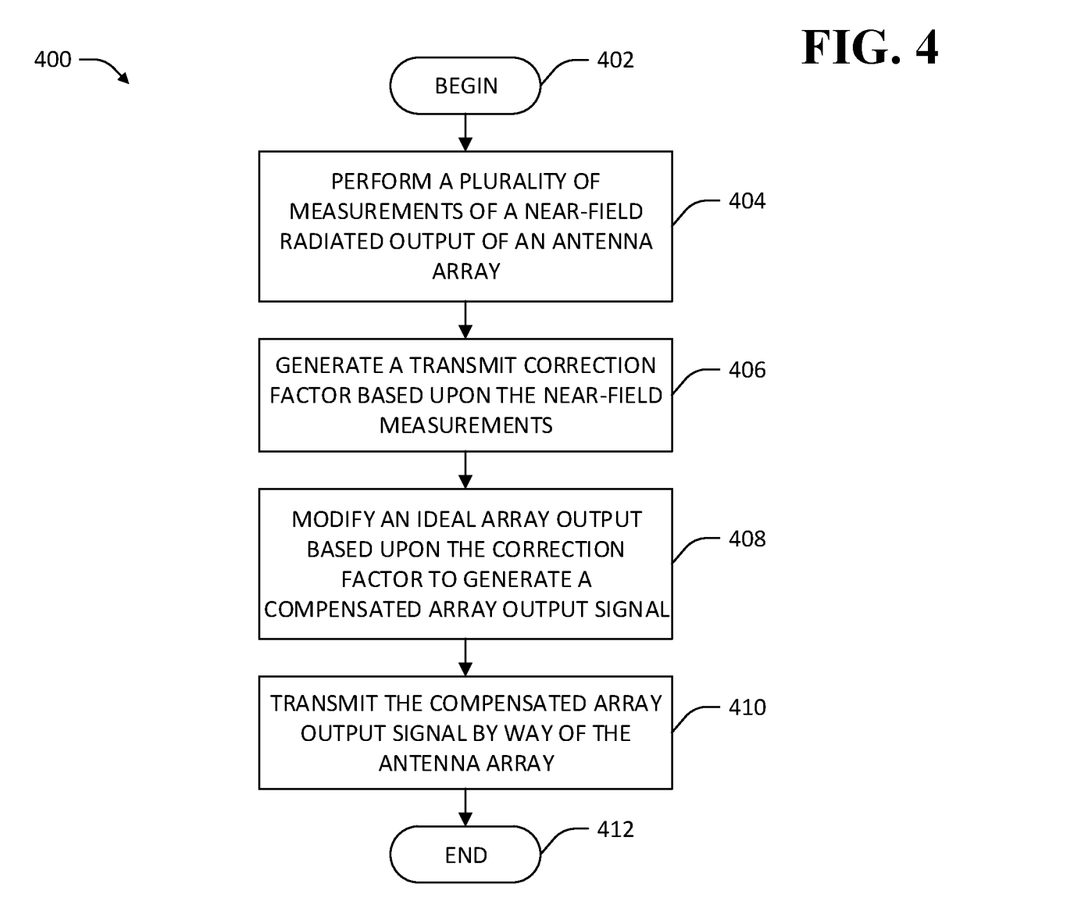
FIG. 4 is a flow diagram that illustrates an exemplary methodology for compensating for mutual coupling between elements of an antenna array during transmission.

Referring now to FIG. 4, a methodology 400 that facilitates calibration of an antenna array to compensate for mutual coupling between elements of the array while the array is transmitting is illustrated. The methodology 400 begins at 402 and at 404 a plurality of near-field measurements of a radiated output of an antenna array are performed. In an example, the near-field measurements are performed by receiving radiated signals from elements of the antenna array by way of a probe antenna that is not part of the antenna array, and sampling electrical signals output by the probe to generate the measurements. At 406 a transmit correction factor is generated based upon the near-field measurements. At 408, a desired array output signal is modified based upon the correction factor to generate a compensated array output signal. The desired array output signal is a signal that is desirably radiated by way of the antenna array. In general, however, due to mutual coupling between elements of the array, the desired array output signal will be distorted if transmitted by way of the array, such that the observed radiated output of the array is not the desired output of the array. The compensated array output signal is configured to at least partially correct for mutual coupling between elements in the array. At 410 the compensated array output signal is transmitted by way of the array, such that the observed output of the array more closely approximates the desired output of the array than if the desired array output signal had been transmitted by way of the array. At 412 the methodology 400 completes.

Figure 5:
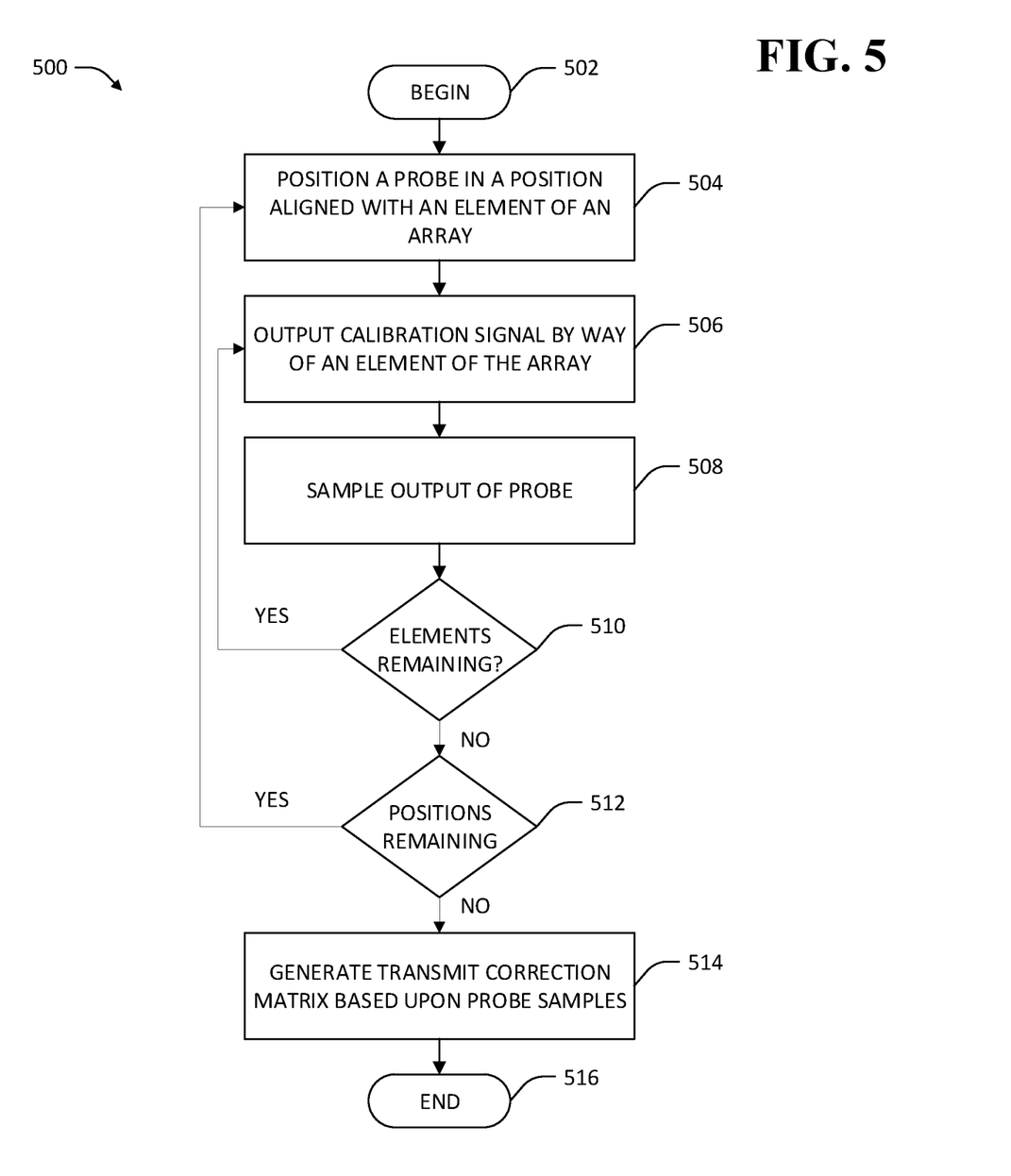
FIG. 5 is a flow diagram that illustrates an exemplary methodology for generating an transmit compensation matrix to correct for mutual coupling between elements of an array during transmission.

Referring now to FIG. 5, an exemplary methodology 500 for performing near-field measurements to facilitate generating a transmit correction factor to compensate for mutual coupling between elements of an antenna array is illustrated. The methodology 500 begins at 502 and at 504 a probe is positioned in a position that is aligned with a first element of an array. The position is in a near-field region with respect to the element to which the position corresponds. In an example, the position is directly in front of the element rather than being offset from the element. At 506, a calibration signal is radiated by way of an element of the array. In an example, the calibration signal is output by the first element of the array. In another example, the calibration signal may be output by a second element of the array different from the first element of the array. When the calibration signal is output by way of the element of the array, the element radiates the calibration signal. At 508 an electrical signal output by the probe is sampled to generate data indicative of the radiated signal that impinges on the probe (i.e., the calibration signal radiated by the element at 506). The data can be stored as near-field measurement data by a computing device for later processing.

At 510 a determination is made as to whether there are elements remaining in the array that have not radiated the calibration signal. If at 510 it is determined that there are elements remaining in the array, the methodology 500 returns to 506 and the calibration signal is output by way of another element of the array (e.g., an element different from those elements that have already radiated the calibration signal while the probe is in the first position). At 508 the output of the probe is sampled again to generated data indicative of the signal radiated by the new element of the array that impinges on the probe. The methodology 500 then returns to 510, where the determination whether there are remaining elements is made again. If there are no remaining elements of the array that have not radiated the calibration signal while the probe is in the first position, the methodology 500 proceeds to 512, where a determination is made whether there are positions where the probe has not yet been placed. For example, the determination 512 can be a determination whether the probe has been positioned in every one of a predefined set of positions, the predefined set comprising one position for each of the elements of the array. If there are positions remaining, the methodology 500 returns to 504, and the probe is positioned in a different position that is aligned with a different element of the array than the probe was previously aligned with. The methodology 500 then proceeds from 506 to 510 again. Thus, the steps 506-510 are repeated for each of the plurality of positions of the probe. Therefore, the output samples of the probe performed at 508 will include at least one sampled value of the probe output for each element of the array in each position of the probe. Once there are no more positions of the probe remaining, the methodology 500 proceeds from 512 to 514, and a transmit correction matrix is generated based upon the output samples of the probe, whereupon the methodology 500 completes 516.

Figure 6:
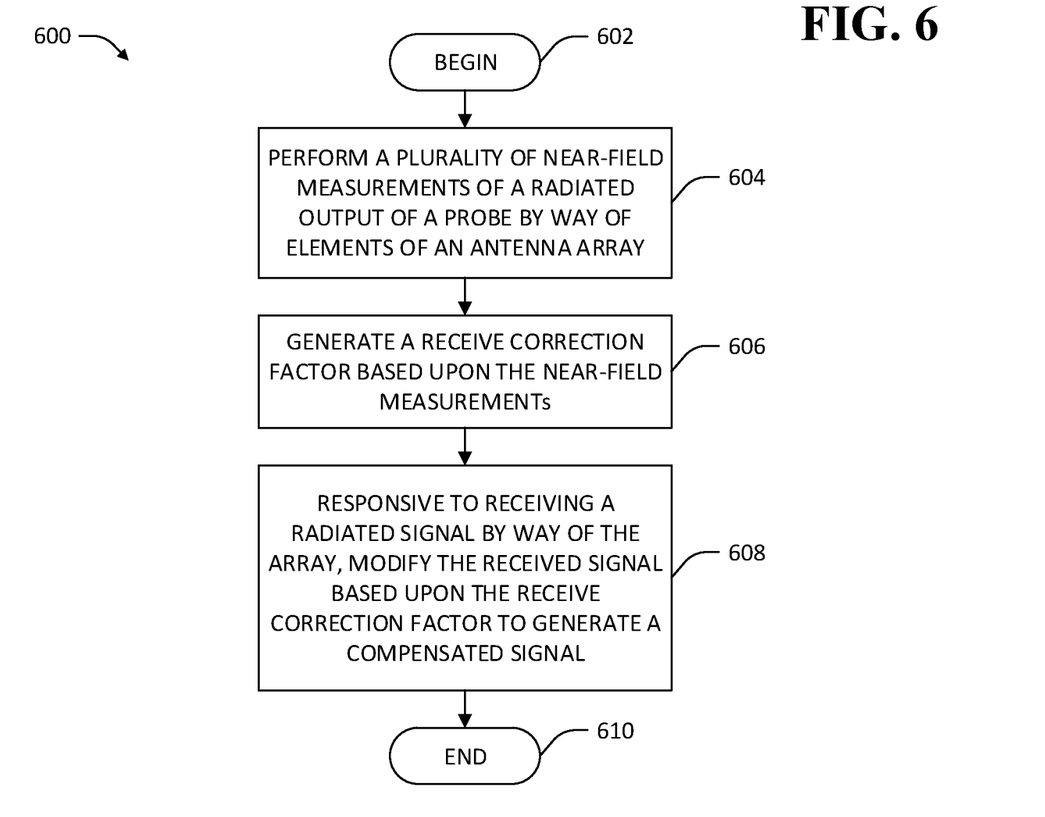
FIG. 6 is a flow diagram that illustrates an exemplary methodology for compensating for mutual coupling between elements of an antenna array during reception.

Referring now to FIG. 6, an exemplary methodology 600 that facilitates calibration of an antenna array to compensate for mutual coupling between elements of the array while the array is receiving is illustrated. The methodology 600 begins at 602 and at 604 a plurality of near-field measurements of a radiated output of a probe are performed by way of elements of an antenna array that is desirably calibrated to generate near-field measurement data. In an example, a calibration signal is radiated by the probe while the probe is in a first position that is aligned with a first element of the array, and each element of the array is sampled to generate data indicative of the radiated signal that impinges on each element. At 606 a receive correction factor is generated based upon the near-field measurement data, where the receive correction factor is configured to at least partially correct for mutual coupling between elements of the array in signals received by way of the array. At 608, responsive to receiving a radiated signal by way of the array, electrical signals received from elements of the array are modified based upon the receive correction factor to generate a compensated signal. The compensated signal is at least partially corrected for mutual coupling effects between the elements of the array. The methodology 600 completes at 610.

Figure 7:
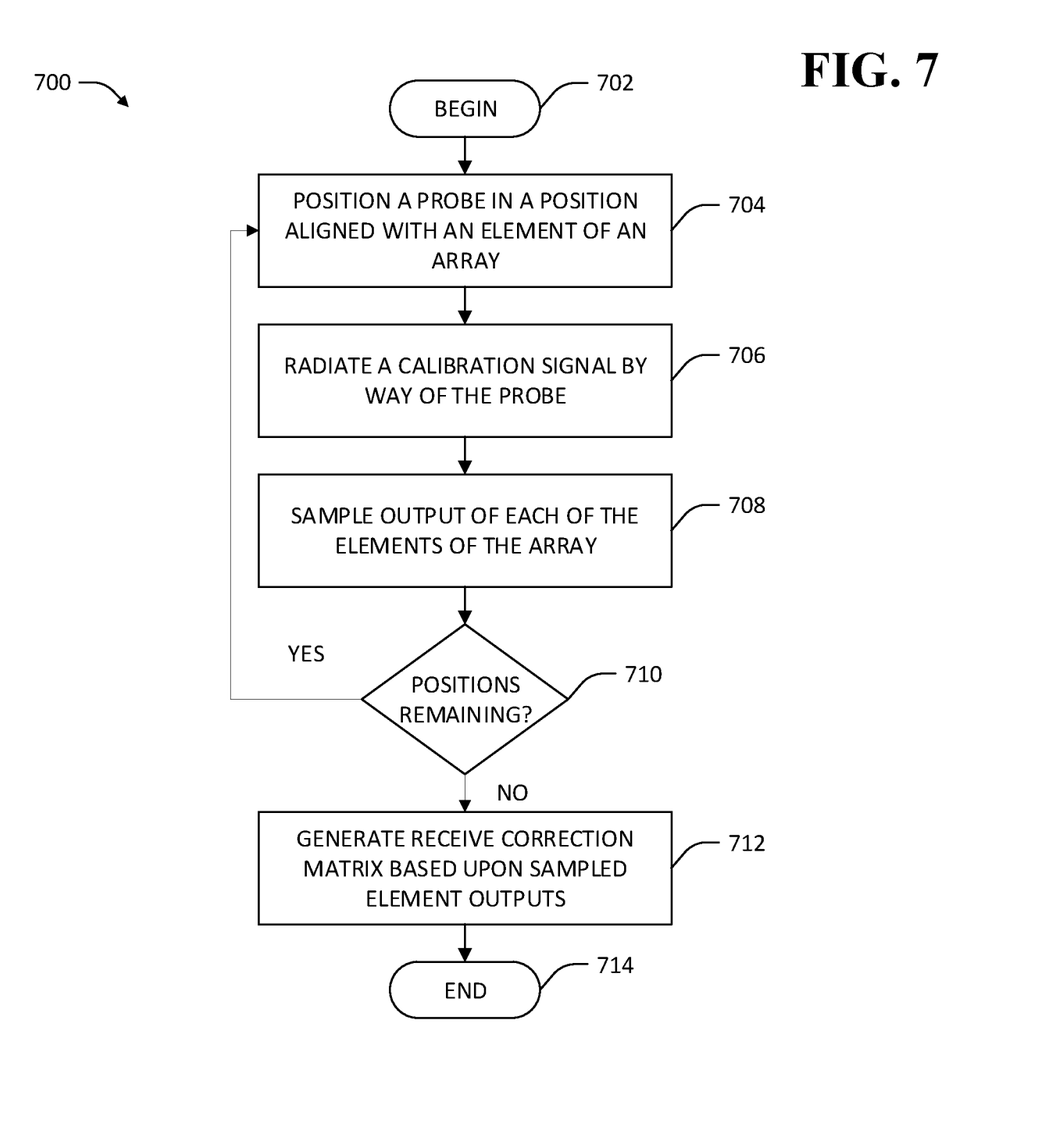
FIG. 7 is a flow diagram that illustrates an exemplary methodology for generating a receive compensation matrix to correct for mutual coupling between elements of an array during reception.

Referring now to FIG. 7, an exemplary methodology 700 that facilitates performing near-field measurements to generate a receive correct factor to compensate for mutual coupling between elements of an antenna array is illustrated. The methodology 700 begins at 702 and at 704 a probe is positioned in a position that is aligned with an element of an antenna array. In an example, the position is a position selected from a predefined set of positions that includes one position for each of the elements of the array, wherein each of the positions is aligned with a respective element in the array. At 706 a calibration signal is radiated by way of the probe. At 708 a respective output of each of the elements of the array is sampled, wherein the outputs of the elements are stimulated by impingement of the radiated calibration signal on the elements. At 710 a determination is made as to whether the probe has been positioned in each of the predefined positions or whether there are positions in the predefined positions that remain. If there are positions remaining, the methodology 700 returns to 704, and the probe is positioned in another position selected from among the predefined positions that is aligned with a different element of the array than previous positions of the probe. The calibration signal is again radiated by way of the probe at 706, the outputs of the elements sampled at 708, and the determination made again at 710. If it is determined at 710 that there are no positions of the probe remaining, the methodology 700 proceeds to 712. Thus, from 704-710 each element of the array is sampled for each position of the probe, yielding n×n sampled outputs. At 712, a receive correction matrix is generated based upon the sampled element outputs, whereupon the methodology 700 ends 714.

Figure 8:
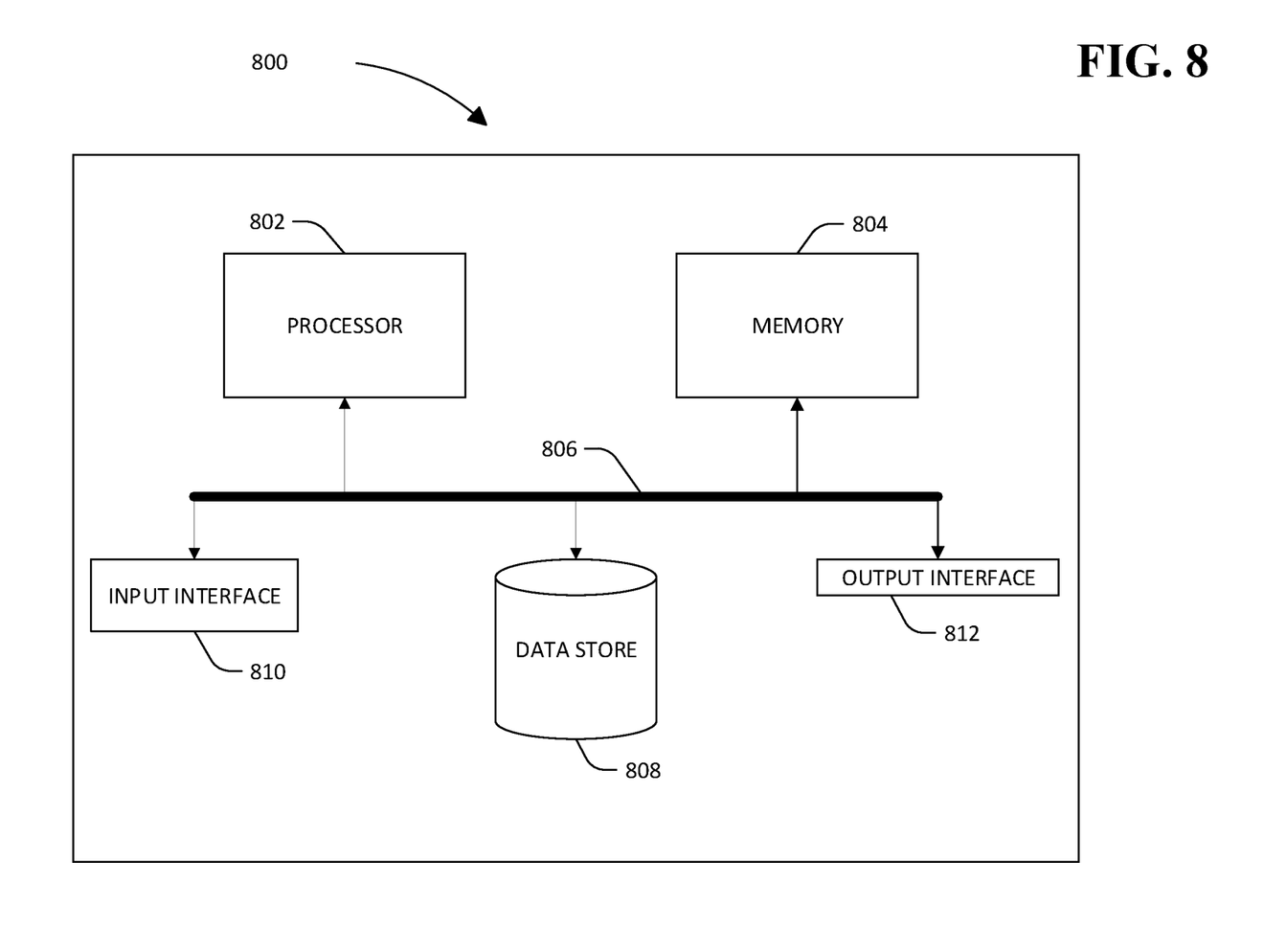
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that computes transfer functions between signals input to an antenna array and signals received at a probe positioned in the near-field region of the array. By way of another example, the computing device 800 can be used in a signal output system that implements signal corrections on signals desirably output by way of an antenna array. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store near-field measurement data, transmit/receive correction data, calibration signal parameters, etc.

The computing device 800 additionally includes a data store 808 that is accessible by the processor 802 by way of the system bus 806. The data store 808 may include executable instructions, near-field measurement data, transmit/receive correction factors, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASIC s), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method for calibrating an antenna array, the antenna array comprising a plurality of elements, wherein signals output by the plurality of elements are distorted by mutual coupling between the plurality of elements or coupling between channels of the antenna array, the method comprising:

performing a plurality of near-field measurements of a radiated output of the antenna array by way of a probe or probes to generate near-field measurement data over a desired operational frequency range, wherein performing the plurality of near-field measurements includes:

positioning the probe or probes in a first position aligned with a first of the plurality of elements of the antenna array;

outputting a radiated signal by way of each of the plurality of elements of the antenna array in turn, such that only a single element is radiating at a time, the radiated signal covering the desired operational frequency range;

responsive to receiving the radiated signal from the plurality of elements in the antenna array at the probe or probes, outputting first data, the first data indicative of mutual coupling between the first element and remaining plurality of elements in the antenna array over the desired operational frequency range, the near-field measurement data comprising the first data; and repeating the positioning, outputting the radiated signal, and outputting data for each of a plurality of positions of the probe or probes, each of the positions aligned with a respective one of the plurality of elements in the antenna array;

generating a transmit correction factor over the desired operational frequency range based upon the near-field measurement data;

modifying an ideal array output based upon the transmit correction factor to generate a compensated array output signal, the ideal array output representative of a signal desirably output by way of the antenna array; and transmitting the compensated array output signal by way of the antenna array, wherein the compensated array output signal is configured to at least partially correct for mutual coupling between the plurality elements in the antenna array.

2. The method of claim 1, wherein the first data comprises data indicative of an amplitude and a phase of the radiated signal as a function of the desired operational frequency range as received at the probe or probes from each of the respective elements in the antenna array.

3. The method of claim 1, wherein the antenna array comprises an active electronically scanned array.

4. The method of claim 1, wherein the compensated array output signal is configured to maintain phase coherence between the plurality of elements of the antenna array.

5. The method of claim 1, wherein generating the transmit correction factor comprises computing a plurality of transfer functions, each of the transfer functions being a transfer function from a calibration signal to a radiating signal received at the probe or probes.

6. The method of claim 5, wherein generating the transmit correction factor further comprises generating a matrix, the matrix comprising the plurality of transfer functions.

7. The method of claim 6, wherein the ideal array output comprises an ideal array output vector, the ideal array output vector comprising signal values desirably output by each of the respective elements of the antenna array, and wherein modifying the ideal array output comprises multiplying the ideal array output vector by the inverse of the matrix.

8. A method for calibrating an antenna array, the antenna array comprising a plurality of elements, wherein radiated signals incident upon the plurality of elements are distorted by mutual coupling between the plurality of elements or coupling between channels of the antenna array, the method comprising:

performing a plurality of near-field measurements of a radiated output of a probe or probes by way of the plurality of elements of the antenna array to generate near-field measurement data over a desired operational frequency range, wherein performing the plurality of near-field measurements comprises:

positioning the probe or probes in a position aligned with a first of the plurality of elements in the antenna array;

radiating a calibration signal by way of the probe or probes, the thus radiated calibration signal covering the desired operational frequency range;

responsive to receiving the radiated calibration signal at the plurality of elements of the antenna array, outputting first data that is indicative of an electrical signal output by each of the respective elements of the antenna array over the desired operational frequency range; and repeating the positioning, radiating, and outputting for each of a plurality of positions of the probe or probes, each of the positions aligned with a respective element in the antenna array;

generating a receive correction factor over the desired operational frequency range based upon the near-field measurement data, the receive correction factor configured to at least partially correct for mutual coupling between the plurality of elements in the antenna array; and responsive to receiving a radiated signal by way of the antenna array, modifying an electrical signal output by the antenna array based upon the receive correction factor to generate a compensated signal, the compensated signal representative of the radiated signal.

9. The method of claim 8, wherein the first data comprises data that is indicative of an amplitude and a phase as a function of the desired operational frequency range of each respective electrical signal output by the plurality of elements.

10. The method of claim 8, wherein the antenna array comprises an active electronically scanned array.

11. The method of claim 8, wherein generating the receive correction factor comprises computing a plurality of transfer functions, each of the transfer functions being a transfer function over the desired operational frequency range from the calibration signal radiated by way of the probe or probes to an electrical signal output by a respective one of the plurality of elements of the antenna array responsive to receiving the radiated calibration signal at the element.

12. The method of claim 11, wherein generating the receive correction factor further comprises:
generating a matrix of the transfer functions over the desired operational frequency range; and
computing an inverse of the matrix, wherein the inverse of the matrix comprises the receive correction factor.

13. The method of claim 12, wherein the electrical signal output by the antenna array comprises a respective electrical signal for each of the plurality of elements of the antenna array, and wherein modifying the electrical signal comprises multiplying a vector of the respective electrical signals by the inverse of the matrix.

14. A method for calibrating an active electronically scanned array (AESA) to improve beam steering, the AESA comprising a plurality of antenna elements, wherein signals output by the plurality of antenna elements are distorted by mutual coupling between the plurality of antenna elements or coupling between channels of the AESA, the method comprising
positioning a probe in a first position aligned with a first of the plurality of antenna elements in the AESA;
radiating a calibration signal by way of each of the plurality of antenna elements of the AESA one at a time while the probe is in the first position, the thus radiated calibration signal covering a desired operational frequency range;
sampling an electrical signal output by the probe for each of the plurality of thus radiating antenna elements of the AESA while the probe is in the first position to generate a plurality of sampled values over the desired operational frequency range;
repeating the positioning, radiating, and sampling for each of a plurality of positions aligned with respective antenna elements in the AESA;
generating a transmit correction factor over the desired operational frequency range based upon the sampled values, the transmit correction factor configured to at least partially compensate for mutual coupling between the plurality of antenna elements of the AESA; and
transmitting a compensated array output vector by way of the AESA, the compensated array output vector based upon the transmit correction factor.

15. The method of claim 14, wherein generating the transmit correction factor further comprises:
generating a matrix of transfer functions based upon the calibration signal and the sampled values, the matrix of transfer functions being transfer functions from the calibration signal to radiated signals impinging on the probe while the probe is in each of the plurality of positions; and
computing an inverse of the matrix of transfer functions, wherein the inverse of the matrix of transfer functions comprises the transmit correction factor.

16. The method of claim 15, further comprising generating the compensated array output vector by multiplying an ideal array output vector by the inverse of the matrix of transfer functions, wherein the ideal array output vector is representative of signals desirably output by way of the AESA.

* * * * *